F. W. COLBY.
PROCESS OF MAKING REINFORCED SPIRAL PIPE.
APPLICATION FILED NOV. 11, 1907. RENEWED JAN. 31, 1917.
1,238,986.
Patented Sept. 4, 1917.
3 SHEETS—SHEET 3.
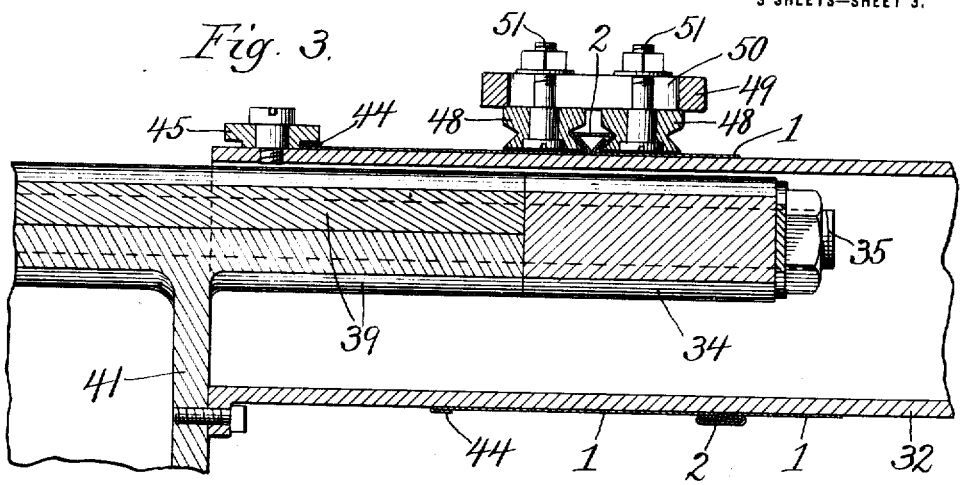
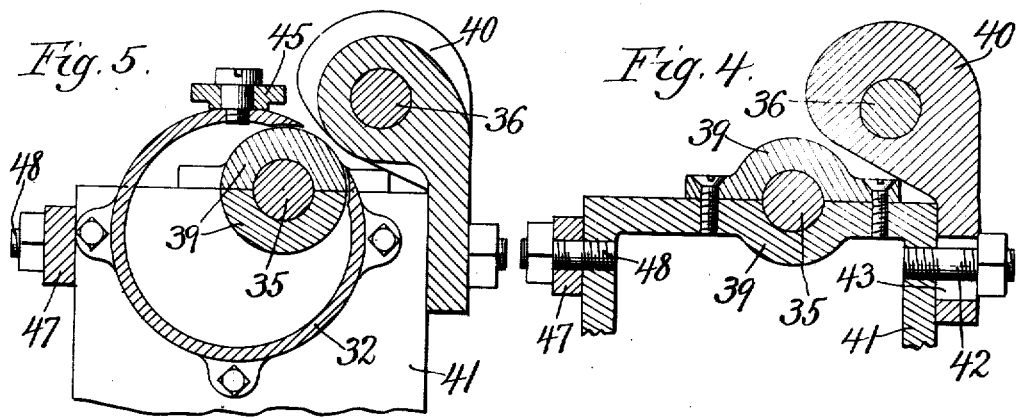
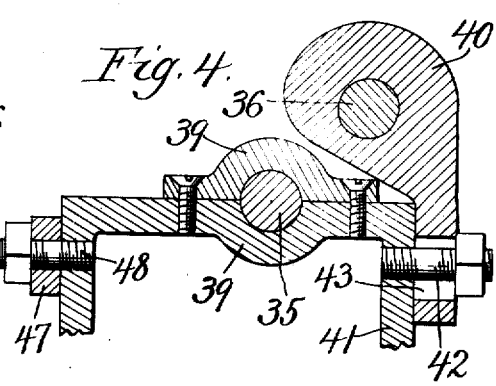
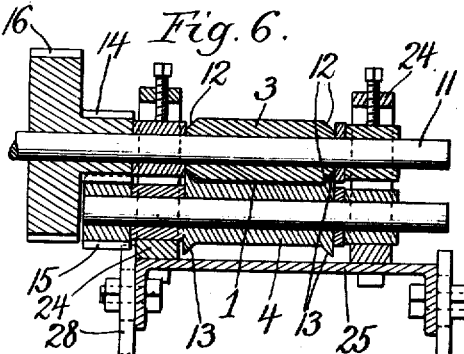
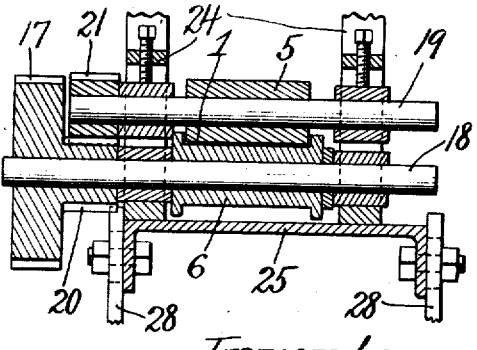

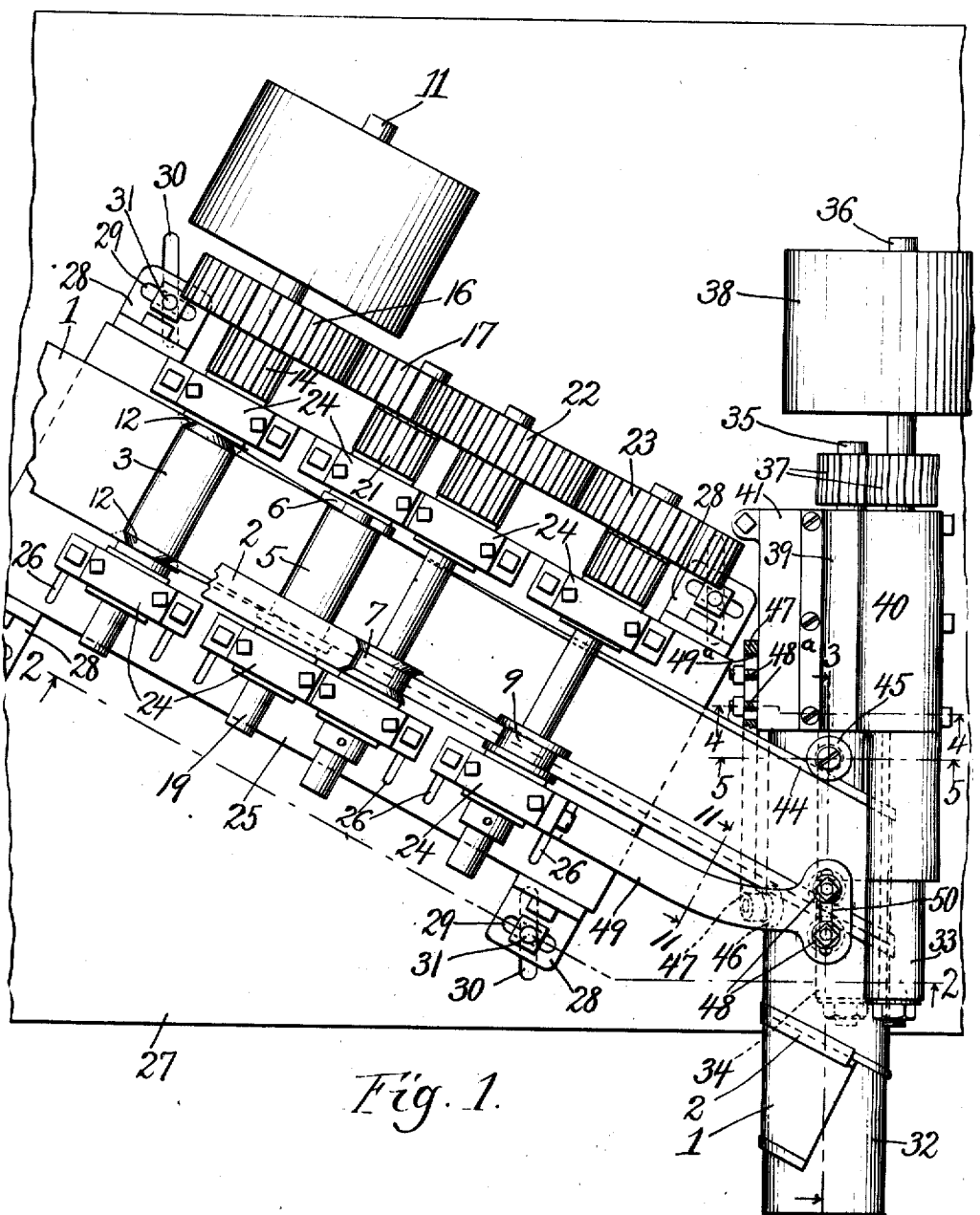

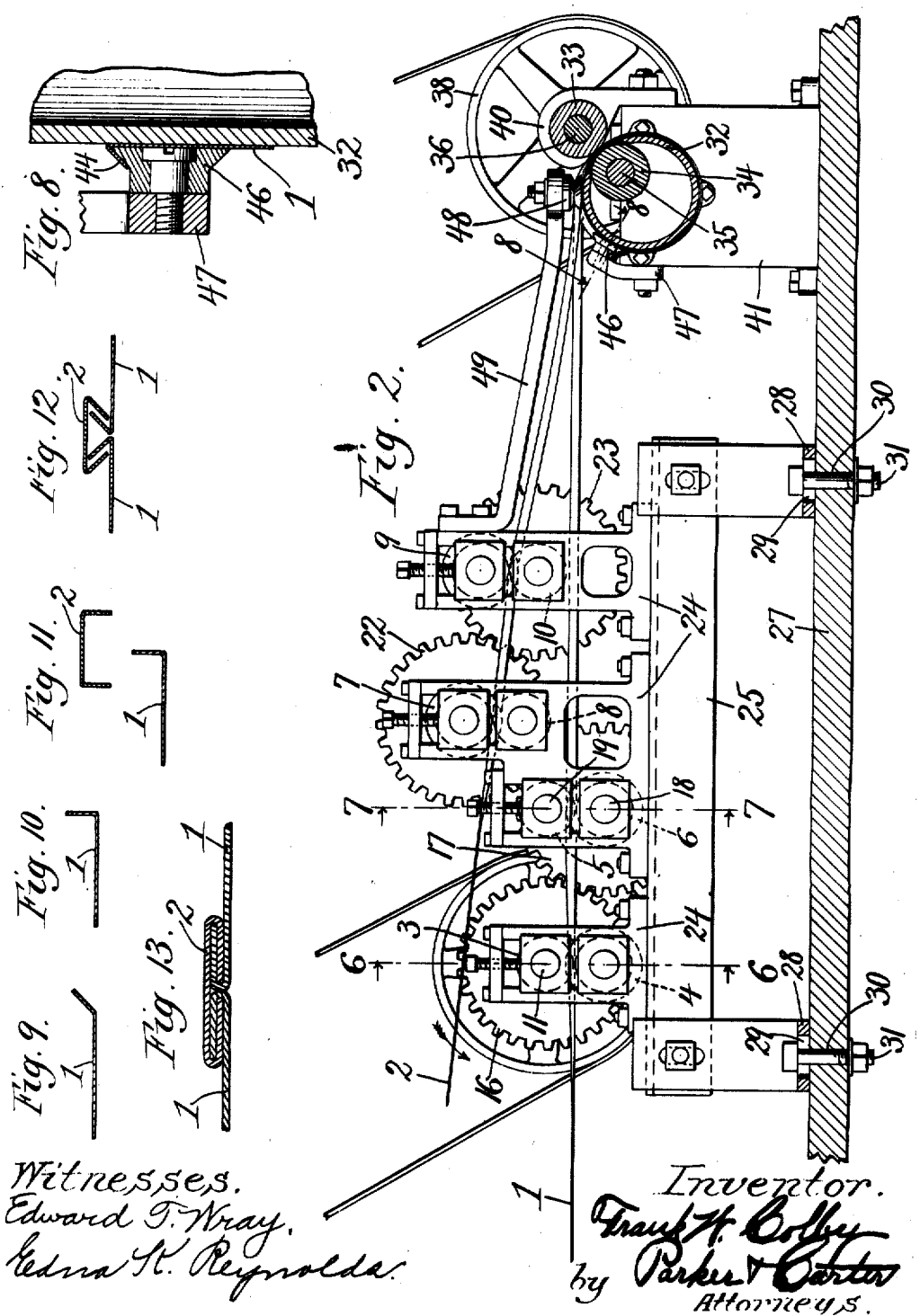

UNITED STATES PATENT OFFICE.

FRANK W. COLBY, OF CHICAGO, ILLINOIS, ASSIGNOR, BY DIRECT AND MESNE ASSIGNMENTS, TO STANDARD SPIRAL PIPE WORKS, OF CHICAGO, ILLINOIS, A CORPORATION OF SOUTH DAKOTA.

PROCESS OF MAKING REINFORCED SPIRAL PIPE.

1,238,986.      Specification of Letters Patent.      Patented Sept. 4, 1917.

Application filed November 11, 1907, Serial No. 401,583. Renewed January 31, 1917. Serial No. 145,817.

*To all whom it may concern:*

Be it known that I, FRANK W. COLBY, a citizen of the United States, residing at Chicago, in the county of Cook and State of Illinois, have invented a certain new and useful Improvement in Processes of Making Reinforced Spiral Pipe, of which the following is a specification.

This invention relates to a process of making reinforced pipe, and has for its object to provide a new and improved process of this description.

Figure 1 is a plan view of one form of apparatus for carrying out my process;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 6 is a sectional view taken on line 6—6 of Fig. 2;

Fig. 7 is a sectional view taken on line 7—7 of Fig. 2;

Fig. 8 is a sectional view taken on line 8—8 of Fig. 2;

Figs. 9, 10, 11, 12 and 13 are views showing the shape of the metal at different steps of the formation of the pipe.

Any desired process may be used for forming the pipe.

In the present case I have illustrated one form of apparatus by means of which a strong, continuous and reinforced pipe is formed from comparatively narrow strips of metal. Strips of metal of any desired size may be used. As herein shown the pipe is formed from the two strips of metal 1 and 2. Some means is provided for bending the edges of these strips. As herein shown the edges of the strip 1 are bent upwardly by means of suitable rollers between which it passes. In the apparatus herein shown the first set of rollers 3 and 4 (see Figs. 1 and 6) partially bend these edges. The roller 4 is cut away at the middle and the roller 3 fits into this cut away portion, the two rollers having beveled faces at 12 and 13 which cause the edges of the strip to be bent. The strip then passes between the rollers 5 and 6 (see Fig. 7). The roller 6 is spool shaped and the roller 5 fits therein so as to bend the edges of the strip of metal 1 at substantially right angles to the body portion. A similar set of rollers 7, 8, 9 and 10 act upon the strip 2 and bend the edges thereof down. These rollers may be operated in any desired manner, and as herein shown are driven from the shaft 11. This shaft directly drives the roller 3, the roller 4 being driven by means of suitable pinions 14, 15. A gear 16 on shaft 11 engages a gear 17 on the shaft 18 carrying the roller 6, while the shaft 19 carrying the roller 5 is driven by means of the pinions 20 and 21. In view of the fact that the roller 6 is driven from the upper roller 3 it will be noted that both sets of rollers will move in the same direction so as to assist in pulling the strip of metal therethrough. The gear 17 meshes with gear 22 connected with roller 7 so as to drive it, and roller 8 is driven from roller 7. The gear 22 engages a gear 23 which drives roller 10 and roller 9 is driven therefrom, the two sets of rollers being driven in the same direction so as to assist in pulling the strip 2 therethrough. The two rollers of each set, of course, are driven in opposite directions in the usual manner. The strip 1 may be termed the main strip, and the strip 2 the reinforcing strip. The supports 24 for the bearings of the various rollers are preferably adjustably mounted upon the frame 25 so that they may be spread apart to permit rollers of different lengths to be used in order that strips of material of different widths may be formed into pipe. The frame 25 is also adjustable upon the base 27 so as to secure a further adjustment. The parts are arranged to produce a universal adjustment. This is accomplished in the drawing by providing the foot 28 with a slot 29, and the base with a diagonal slot 30 and fastening the foot to the base by a bolt 31. It will be seen that any desired adjustment may thus be secured. These rollers may be called the shaping rollers. After the edges of the strips 1 and 2 are properly bent the strips are curved or bent into a spiral, and the adjacent edges united. Any suitable means for this purpose may be used. As herein shown a hollow tube or mandrel 32 is provided. Associated with the mandrel or hollow cylinder are two uniting rollers 33, 34, one within the cylinder and the other exterior thereto, the cylinder being cut away opposite these rollers so that they may compress between them anything passing around the cylinder. These two rollers are driven in any desired manner, as, for example, by means of the shafts 35 and 36 connected by gears 37 with the pulley 38. These uniting rollers may be driven from the same source of power as the shaping rollers, and the two sets of rollers are preferably driven at the same peripheral speed, so that the strips of material will be properly fed between them. The shaft 35 is mounted in a suitable bearing 39, and the shaft 36 in a suitable bearing 40. The bearing 40 is adjustable so that the space between the rollers may be varied. As herein shown this bearing is mounted upon the frame 41 by means of the bolt 42 there being a slot 43 to permit proper adjustment. In uniting the strips of material the strip 1 is first formed into a part of a spiral. This is preferably done by giving it, say, one turn about the cylinder 32. I have found that if the bent edge 44 is left in proper position to be interlocked with the bent edge of the strip 2 it will be injured when bent about the cylinder 32. In order to prevent this injury I therefore provide an edge-flattening device 45 which bends the edge 44 back upon the body of the strip 1 so that in passing around the cylinder it is not injured. This flattening device may be of any desired construction, and as herein shown consists of a wheel or disk fastened to the cylinder 32 (see Fig. 5). Before the edge 44 can be interlocked with the edges of the strip 2 it must be again loosened or raised to its proper interlocking position. Some suitable loosening or raising device may be provided. As herein shown such a device 46 is provided. This loosening or raising device as herein shown consists of a disk with a beveled edge located so that the beveled edge passing over the flattened edge of the strip loosens or lifts it to its interlocking position. This loosening or raising device is preferably adjustable so that its position may be varied to adjust it to strips of different widths. As herein shown it is connected to a supporting piece 47 which is adjustably connected to the frame by means of the bolts 48ª which pass through a slot 49ª in the support. When the two edges of the strip 1 are brought opposite each other by the turn about the cylinder 32, the bent edges of the strip 2 are brought into proximity to the edges of the strip 1 and some means is provided for interlocking these edges. As herein shown the interlocking device consists of the beveled wheels 48 between which the strip 2 passes, said beveled wheels being adjustably supported upon a supporting device 49, attached to a suitable fixed part. These wheels 48 are adjustable upon the support so as to adjust the device for strips of various widths. This adjustment is secured by providing the support with a slot 50 (see Figs. 1 and 3), and connecting the rollers thereto by means of bolts 51. The support 49 may be connected with the bearing support for the rollers 9 and 10 so that it will be moved to a proper position when the parts are adjusted for using strips of various widths. When the adjacent bent edges of the strip 1 and the strip 2 and the bent edges thereof pass between these rollers 48 they cause the bent edges to interlock as shown in Figs. 3 and 12. These interlocking edges then pass between the rollers 33 and 34, and are clamped or united together, the parts then being moved to the position shown in Fig. 13. The strips 1 and 2 are thus pulled along, and formed into spirals and fastened or united together so as to form a continuous spiral pipe, such pipe being reinforced, as it were, by the strip 2 so as to be made strong and durable. After the pipe is formed it may be galvanized or otherwise treated, and the joints between the two strips may be soldered or otherwise treated, although such treatment is not ordinarily required, the joint being tight and secure as soon as the pipe is formed.

It will be noted that in carrying out this process, two strips of material are provided. The edges of these strips are then bent so that they will be at an angle with the main body of the strips. One bent edge of one of the strips is then bent down and a portion of such strip formed into spiral cylindrical form. After said portion has been formed into spiral cylindrical form, the bent down edge is loosened up and then one edge of the other strip is positively tucked under the bent edge of the portion of the first strip which has been formed into spiral cylindrical form and the other edge of the other strip is positively tucked under the other edge of the first strip before that portion of the first strip is formed into spiral cylindrical form, and then said bent edges are compressed so as to cause them to interlock and overlap to form a continuous pipe of great strength and durability which can resist internal and external pressure and remain intact under such pressure.

The use and operation of my invention are as follows:

The edges of the two strips of material are properly bent by passing them between the respective rollers. When the strip 1 passes between the rollers 3 and 4 each edge takes the position shown in Fig. 9. When the strip passes between the rollers 5 and 6 each edge takes the position shown in Fig. 10. When the strip 2 passes between its two sets of rollers the edges thereof take the position shown in Fig. 11. The strips are then passed about the cylinder 32, the edge 44 being first turned down by the flattening device 45, such edge after passing around the cylinder and just before reaching its interlocking position, being loosened or turned up by the loosening device 46, as shown in Fig. 8. The interlocking device then acts on the adjacent edges of the strip 1 and the edges of the strip 2, moving them into the interlocking position shown in Fig. 12. These edges then pass between the uniting rollers 33 and 34, whereupon they are mashed down and fastened firmly together, as shown in Fig. 13. The process is then continued and the pipe formed of any desired length, such pipe being reinforced by the strip 2.

I claim:

1. The process of making pipe which consists in providing a plurality of strips of material, then bending the edges of said strips, then bringing the edges of the strips into proximity, then positively tucking the bent edges of one strip beneath the bent edges of the other strip and then compressing and flattening said bent interlocking edges as the strips are given a spiral form so as to permanently overlap and interlock them to form a single continuous pipe.

2. The process of making pipe which consists in providing a plurality of flat strips of material and setting said strips in motion at substantially the same speed, then while the strips are in motion bending the edges of one strip in one direction and the edges of the other strip in the opposite direction, then while the strips are still in motion forming them successively into spiral form and positively tucking the bent edges of one strip beneath the bent edges of the other strip and then at a point in advance of the point where the bent edges of one strip are tucked beneath the bent edges of the other strip, flattening said bent edges so as to firmly unite them to form a continuous spiral pipe.

3. The process of making spiral pipe which consists in providing a plurality of flat strips of material, then simultaneously setting said strips in motion, then bending the edges of adjacent strips in opposite directions so that they project at an angle to the middle portions of said strips, then interlocking said bend edges by tucking the bent edges of one strip beneath the bent edges of the other strip and then after the edges of the strips have been thus interlocked flattening said bent edges and forming said strips into spirals so as to form a continuous pipe.

4. The process of making pipe, which consists in providing two strips of material, then bending the edges of one strip in one direction and the edges of the other strip in the opposite direction, then forming a portion of a spiral with one strip and at the same time bending down one of the bent edges thereof, then loosening up said bent edge so as to provide a space between it and the other portion of the strip, then uniting the edges of one strip with the adjacent edges of the other strip and forming both of said strips into spirals.

5. The process of making pipe which consists in providing two strips of material, then simultaneously setting said strips in motion, then bending the edges of said strips while in motion, then positively tucking the bent edges of one strip into the space between the other strip and the bent edges thereof and then forming said strips into a spiral and compressing the bent edges thereof so as to firmly unite the strips together to form a spiral pipe.

6. The process of making pipe which consists in providing two strips of material, then bending the edges of said strips so that they will be at an angle with the main body of said strips, then forming a portion of one of said strips into spiral cylindrical form and then positively tucking one bent edge of the other strip under the bent edge of the portion of the first strip which has been formed into spiral cylindrical form and the other edge of the other strip under the other edge of the first strip before that portion of the first strip is formed into spiral cylindrical form and then bending said bent edges so as to cause them to interlock and overlap to form a continuous pipe.

7. The process of making pipe which consists in providing two strips of material, then bending the edges of said strips so that they will be at an angle with the main body of said strips, then bending down one bent edge of one of said strips and forming a portion of said strip into spiral cylindrical form and then after said portion has been formed into spiral cylindrical form loosening up said bent down edge and then positively tucking one edge of the other strip under the bent edge of the portion of the first strip which has been formed into spiral cylindrical form and the other edge of the other strip under the other edge of the first strip before that portion of the first strip is formed into spiral cylindrical form and then bending said bent edges so as to cause them to interlock and overlap to form a continuous pipe.

8. The process of making pipe which consists in providing two strips of material, then simultaneously setting said strips in motion, then bending the edges of said strips at an angle with the body thereof, then forming said strips into a cylindrical form and bending one edge down while in a cylindrical form and then raising said edge when it is desired to interlock it with the adjacent edge and then interlocking the edges of said strips to form a spiral pipe.

9. The process of making pipe which consists in providing two strips of material having their edges bent at an angle to the main body thereof, then forming a portion of a spiral with one of said strips and bending one edge of said spiral portion down while it is being formed into a spiral and then raising the edge as it approaches the other edge of said piece and then interlocking and permanently fastening the edges of the two pieces together to form a continuous spiral pipe.

FRANK W. COLBY.

Witnesses:
EDNA K. REYNOLDS,
SOPHIE B. WERNER.